(No Model.) 2 Sheets—Sheet 1.

W. STANLEY, Jr. & O. B. SHALLENBERGER.
ARMATURE FOR DYNAMO ELECTRIC MACHINES.

No. 333,563. Patented Jan. 5, 1886.

Witnesses,
Chas. C. Claggett.
Benjamin Barker, Jr.

Inventors.
William Stanley Jr.,
Oliver B. Shallenberger.
By their Attorney C. A. Collins (No Model.) 2 Sheets—Sheet 2.

W. STANLEY, Jr. & O. B. SHALLENBERGER.
ARMATURE FOR DYNAMO ELECTRIC MACHINES.

No. 333,563. Patented Jan. 5, 1886.

Witnesses.
Chas. C. Claggett.
Benjamin Bakewell, Jr.

Inventors
William Stanley Jr.,
Oliver B. Shallenberger.
By their Attorney
C. A. Collins

UNITED STATES PATENT OFFICE.

WILLIAM STANLEY, JR., AND OLIVER B. SHALLENBERGER, OF PITTSBURG, PENNSYLVANIA.

ARMATURE FOR DYNAMO-ELECTRIC MACHINES.

SPECIFICATION forming part of Letters Patent No. 333,563, dated January 5, 1886.

Application filed August 7, 1885. Serial No. 173,846. (No model.)

*To all whom it may concern:*

Be it known that we, WILLIAM STANLEY, Jr., and OLIVER B. SHALLENBERGER, both citizens of the United States, residing in the city of Pittsburg, in the county of Allegheny and State of Pennsylvania, have invented certain new and useful Improvements in Armatures for Dynamo-Electric Machines, of which the following is a full and exact specification.

Our invention relates to that class of armatures which are known as "drum-armatures;" and the object of our improvements is to provide for such armatures cores that will not be subject to induced Foucault currents and consequent heating, and will permit the rapid radiation and removal of any heat that may be generated in the core.

Figure 1:
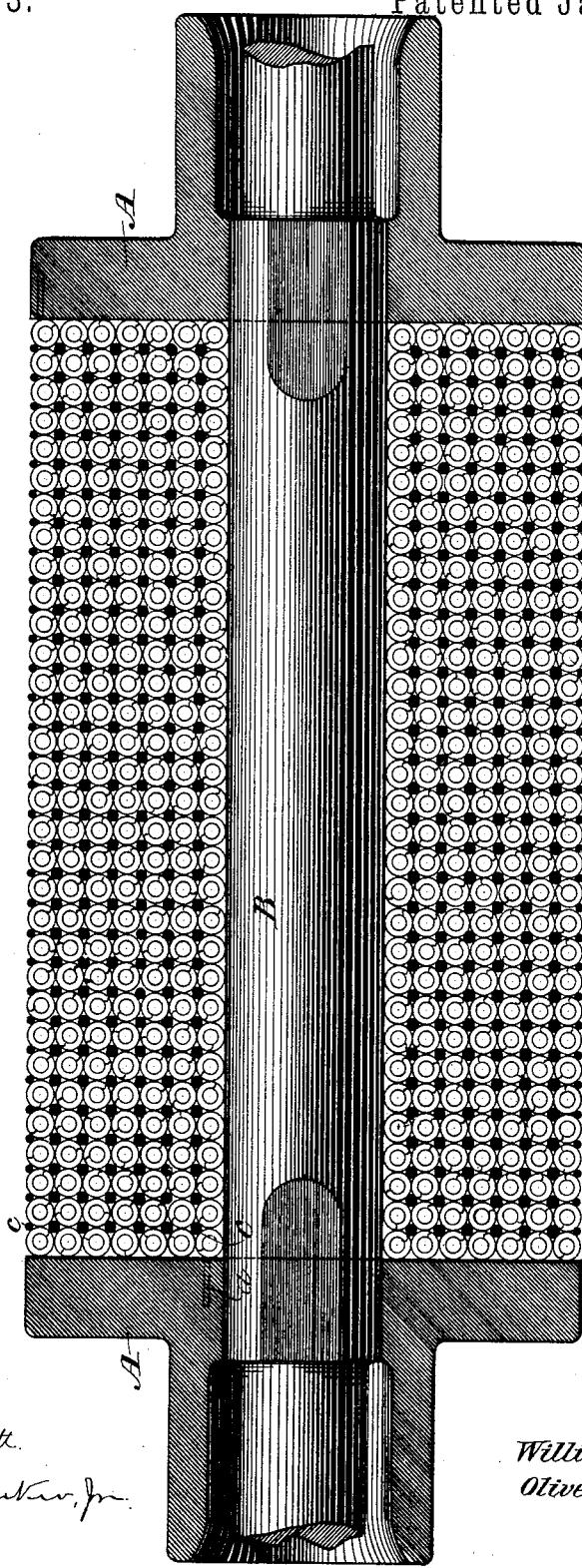
Figure 2:
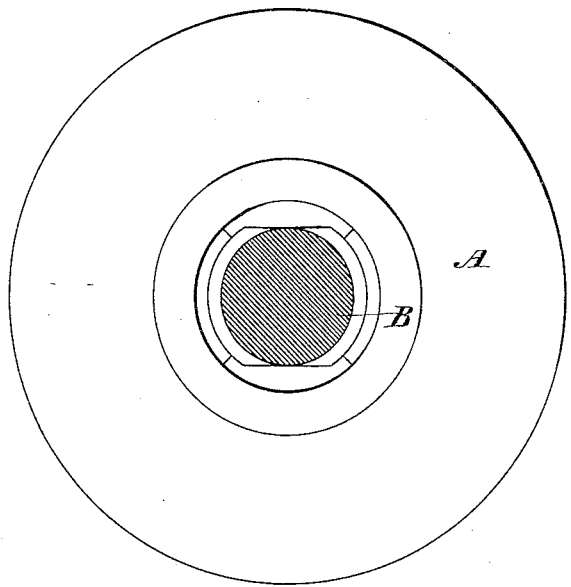
Figure 3:

In the drawings, Figure 1 represents a longitudinal section of the core; Fig. 2, a cross-section through the end plate, A, and Fig. 3 a section of coiled iron wire.

In making the core two iron end plates, A A, are keyed upon a shaft, B. To one of the end plates, as at *a*, next the shaft B, is fastened one end of a spirally-coiled iron wire, *b*. This fastening may be done by drilling a hole in the end plate and inserting the end of the wire therein, or by securing it in any suitable manner. After the end of the spirally-coiled wire is fastened it is wound closely around the shaft B until the other end plate is reached, where the other end of the wire is fastened in a similar manner. A straight wire, *c*, is then fastened to the end plate and wound so as to lie in the depressions between the convolutions of coiled wire, then another layer of coiled wire is wound, and so on until the entire space between the end plates is filled.

Instead of making each layer of wire of a separate piece fastened at each end to the end plates, the wire may be made in alternate sections coiled and straight, so that after a winding of coiled wire is completed it will be followed by a winding of straight wire; or after a winding of coiled wire is completed a piece of straight wire of suitable length may be attached to the free end of it and wound, then a piece of coiled wire to that, and so on. The object of the straight wire is to give more body to the core than could be obtained by the use of the coiled wire alone, and, if desired for this purpose, two or more layers of straight wire may be wound between each two layers of the coiled wire. Before being wound the wire should be japanned, or suitably insulated in other ways that will readily suggest themselves to those skilled in the art.

Such an armature-core as we have described is almost entirely free from induced currents in the core and consequent heating, while any heat that may be generated in the core is rapidly radiated from the interior surface of the windings of spirally-coiled wire and quickly carried off by the air-currents which circulate freely through the interior of the core.

What we claim as new, and desire to secure by Letters Patent, is—

1. An armature-core composed of spirally-coiled wire wound in layers about a central shaft and having straight wire wound in the interstices formed by the layers of coiled wire, substantially as and for the purposes set forth.

2. An armature-core composed of spirally-coiled and straight wire wound in alternate layers about a central shaft, substantially as set forth.

3. In an armature-core, the combination of a central shaft, end plates thereon, and spirally-coiled and straight insulated wire wound in alternate layers upon the shaft and between the end plates, substantially as set forth.

WILLIAM STANLEY, JR.
OLIVER B. SHALLENBERGER.

Witnesses to the signature of William Stanley, Jr.:
S. F. RANDALL,
HERBERT L. LUQUES.

Witnesses to the signature of Oliver B. Shallenberger:
ALBERT SCHMID,
GEO. H. KIMBER.